United States Patent [19]

Park et al.

[11] 4,008,361
[45] Feb. 15, 1977

[54] REMOVAL OF RESIDUAL VINYL HALIDE MONOMER FROM VINYL HALIDE POLYMERS BY RADIO FREQUENCY DIELECTRIC HEATING

[75] Inventors: Anthony John Park, South Croydon; Brian Weeks, Epsom, both of England

[73] Assignee: The British Petroleum Company Limited, London, England

[22] Filed: Dec. 11, 1975

[21] Appl. No.: 639,967

[30] Foreign Application Priority Data

Oct. 23, 1975 United Kingdom ............ 43580/75

[52] U.S. Cl. .................................. 528/503; 526/344
[51] Int. Cl.² .......................................... C08F 6/00
[58] Field of Search .................................. 528/503

[56] References Cited

FOREIGN PATENTS OR APPLICATIONS 1,226,988 3/1971 United Kingdom ........ 528/503 UX
1,277,609 6/1972 United Kingdom ........ 528/503 UX

*Primary Examiner*—Stanford M. Levin
*Attorney, Agent, or Firm*—Brooks Haidt Haffner & Delahunty

[57] ABSTRACT

The residual vinyl halide content of vinyl halide polymer is reduced by radiofrequency dielectric heating of a water-containing layer of particulate polymer over which is disposed a layer of material through which vinyl chloride can pass but which restricts the passage of water e.g. perforated plastic sheet.

18 Claims, 1 Drawing Figure

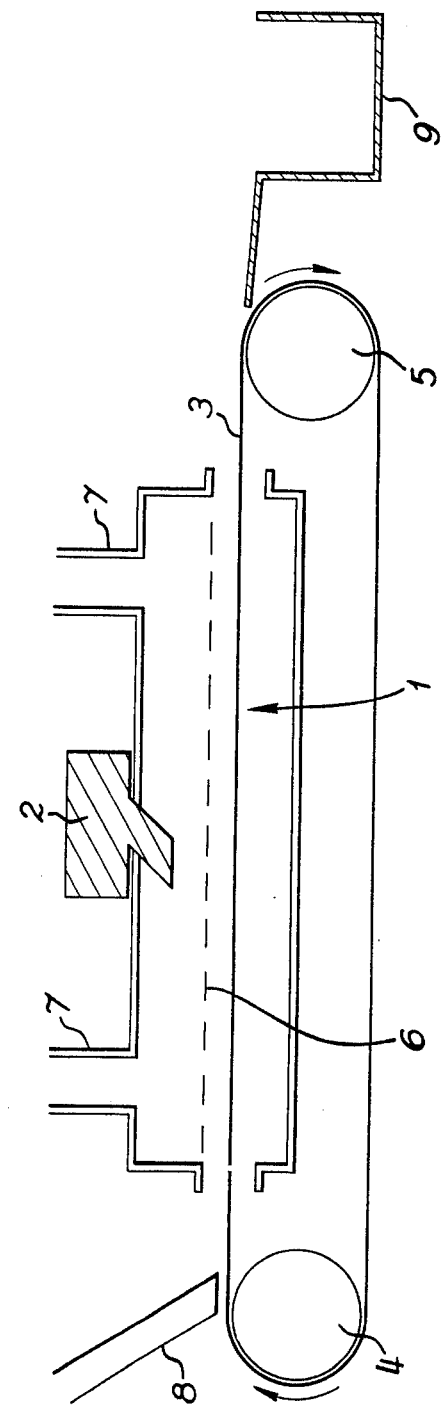

REMOVAL OF RESIDUAL VINYL HALIDE MONOMER FROM VINYL HALIDE POLYMERS BY RADIO FREQUENCY DIELECTRIC HEATING

The present invention relates to a process for the reduction of the vinyl halide content of vinyl halide polymers.

Vinyl halide polymers absorb vinyl halide monomers. Thus, polyvinyl chloride can absorb up to 30% by weight of vinyl chloride. Vinyl halide polymer produced during polymerisation will contain absorbed vinyl halide monomer, and although most of the absorbed monomer is removed as the polymerisation proceeds, there is normally a residue left in the polymer. Recent discoveries have suggested that vinyl chloride monomer may cause the rare liver cancer angiosarcoma. It is therefore, highly desirable to reduce the level of residual vinyl halide, and particularly vinyl chloride, to the lowest possible value.

According to the present invention the process for reducing the vinyl halide content of a vinyl halide polymer containing vinyl halide monomer comprises heating a water-containing layer of the polymer in particulate form in a zone of radio frequency dielectric heating in which zone a layer of material through which vinyl chloride can pass but which restricts the passage of water vapour, and which is substantially transparent to the radio frequency used to heat the polymer, is disposed over the surface of the layer of polymer so as to reduce evaporation of water from the layer of polymer during the dielectric heating, and recovering the particulate polymer.

If vinyl halide polymer, exposed to the atmosphere, is subjected to radio frequency dielectric heating the water present in the polymer will evaporate off leading to a drying of the polymer. It has now been found, however, that it is undesirable if the object is to reduce the vinyl halide content of vinyl halide monomer to allow water present in the polymer to evaporate.

The vinyl halide polymer and monomer may contain up to 30% by weight of copolymerised or copolymerisable monomer. Examples of copolymerisable monomers are ethylene, propylene, vinyl acetate, vinyl laurate, vinyl stearate and vinylidene chloride. The present invention is particularly applicable to homopolymers of vinyl chloride and copolymers of vinyl chloride with less than 20 % by weight of other copolymerisable materials and particularly vinyl acetate.

The wet polymer may be treated directly after polymerisation or at a subsequent stage in its processing. Polymerisation takes place commonly in bulk, in aqueous suspension or micro-suspension or in aqueous emulsion. The process of the present invention is particularly applicable to polymer in the form of beads as it is recovered from conventional suspension polymerisation. Vinyl halide polymer is also produced by mass polymerisation from which it is also commonly recovered in the form of particles. Such particulate polymer, and indeed any of the particulate forms in which vinyl halide polymer is recovered from processes in which it is produced, are particularly suitable for treatment in accordance with the present invention. The process of the present invention is particularly useful in treating coarse polymer, i.e. polymer which has a substantial proportion of larger size particles, for example more than 90% by weight above 150 $\mu$m.

The polymer subjected to the process of the present invention may be wet polymer recovered from a polymerisation carried out in an aqueous medium; alternatively it may be a dry polymer to which water has been added. The polymer desirably contains at least 5% by weight of water, based on dry polymer, preferably at least 10%, when dielectric heating begins. The most preferred water content for polymer treated in the process of the present invention is from 10 to 30% by weight of water. For polymer produced by suspension polymerisation the water content when the dielectric heating begins is at least 15% by weight based on weight of dry polymer. The water content of polymer produced by mass polymerisation is preferably at least 20% by weight based on weight of dry polymer when polymerisation begins.

The particulate polymer may be conveyed continuously through the zone of radio frequency dielectric heating in any suitable manner, for instance on a moving belt or conveyor on which the polymer is spread in a layer which may be from 1 to 30 cm. thick. In the zone of radio frequency dielectric heating a layer of material through which vinyl chloride can pass but which restricts the passage of water vapour is disposed over the surface of the layer of polymer so as to reduce evaporation of water from the layer during the dielectric heating. This layer of material must of course be substantially transparent to the radio frequency energy used to obtain the dielectric heating otherwise the heating of the layer of polymer will be impaired. Examples of suitable materials are plastics sheet, particularly thin sheets or films which may be disposed in the form of flat sheets over the surface of the layer of polymer. Perforations may be provided in the plastics sheet to enable vinyl chloride to pass through the sheet, the total area of the perforations being sufficiently low to restrict the passage of water vapour and so reduce evaporation of water from the layer of polymer. Instead of providing perforations or other openings in the layer of material, the passage of vinyl chloride vapour through the material may be obtained by selecting a material through which vinyl chloride can diffuse rapidly at the temperature reached during the dielectric heating but through which the rate of diffusion of water vapour is sufficiently low to reduce evaporation of water from the layer of particulate polymer. In one form of the invention a horizontal perforated plastics sheet is positioned in the heating zone adjacent to the surface of the polymer layer passing through the zone. The plastics sheet is preferably fixed in position above the surface of the polymer layer, for instance at about 1 cm. from the surface. Alternatively the plastics sheet may be in contact with the polymer layer and may move through the zone with the conveyor system in a continuous manner. The perforations are preferably spaced more or less regularly over the surface of the plastics sheet. The combined area of the perforations in the plastics sheet may amount to up to 0.1% of the total area of the plastics sheet over the polymer layer, preferably having a combined area amounting to about 0.01% of the total area of the plastics sheet over the polymer surface.

The radio frequency dielectric heating employed in the process of the present invention is well known to those skilled in the art of electric heating. Dielectric heating is a method of heating poor electrical conductors by subjecting them to an alternating voltage. The electrical power transferred to the material as heat is a function of frequency, the potential across the material and the dielectric properties of the material. In low frequency dielectric heating the material to be heated is placed between electrodes across which an alternating voltage is applied. The voltage applied is controlled so as not to exceed the breakdown voltage of the material to be heated. The frequencies used for low frequency dielectric heating are typically in the range 1 to 150 MHz, for example 20 to 100 MHz. Although higher frequencies can be used in dielectric heating between electrodes the electrodes need to be smaller to avoid high capacitance between the electrodes leading to excessive damping of the alternating voltage, and emission of stray electromagnetic radiation is increased.

The radio frequency dielectric heating employed is preferably microwave heating. In microwave heating the required alternating voltage is provided by the electrical component of microwave electromagnetic radiation to which the material to be treated is subjected within an enclosure of conducting material. The material to be treated may be placed inside a resonant cavity in which a standing microwave field is produced or in a wave guide along which microwave electromagnetic radiation is passed. The design and operation of microwave ovens is well understood by the those skilled in the microwave heating art. The frequency of the microwaves radiation suitably lies in the range 900 to 30,000 MHz. It should be noted that there are legal limitations on the use of microwaves of various frequencies in many countries throughout the world.

The exposure time in the heating zone may be for periods of 0.1 seconds or less up to 100 minutes, preferably in the range 1 second to 50 minutes, more preferably 1 minute to 10 minutes. The exposure time is preferably correlated with the intensity of radiation and with the water content of the polymer layer entering the heating zone to ensure that the polymer reaches a temperature in the range 70° to 100° C and that the presence of water is maintained in the polymer layer. Preferably the water content of the polymer leaving the heating zone should be at least 5% by weight, more preferably at least 15% by weight, based on dry polymer. At higher temperatures the polymer tends to be degraded.

The process of the present invention is further illustrated diagrammatically with reference to the embodiment of the invention shown in the accompanying drawing. The drawing shows a vertical cross section through a radio frequency dielectric heating zone 1, heated by microwave heating means 2, and through which passes a continuous conveyor belt 3 mounted on driven roller 4 and free roller 5. Mounted above the belt 3 is a perforated sheet of transparent plastic 6 which extends the whole width of the zone 1 to the side walls (not shown). The plastic sheet 6 has random perforations of a combined area totalling 0.005% of the area of the sheet. The zone 1 has a vent 7 through which desorbed monomer is removed by suction.

In operation wet vinyl halide polymer containing vinyl halide monomer is deposited from the chute 8 onto the conveyor belt 3 in a layer about 8 cm. thick and moves continuously through the heating zone 1 beneath the plastic sheet 8 which allows the monomer driven off by the microwave radiation to escape and pass up the vent 7, while maintaining sufficient concentration of water in the polymer. On leaving the heating zone the polymer collects in tank 9.

The following experiments were carried out batchwise to demonstrate the process of the present invention. The polymer used in these experiments was resin polymer i.e. polymer in particulate form which had not been compounded with the usual ingredients e.g. stabilizers, plasticizers, lubricants, which are used to make PVC composition suitable for fabrication.

The following experiments were carried out to demonstrate the process of the present invention.

EXAMPLE A

This is a comparative example not according to the invention.

350g of a suspension PVC homopolymer slurry, 13 mm deep, (90% of particles 150 $\mu$ or larger) of water content 60% by wt. of dry polymer and vinyl chloride content 7,530 ppm were irradiated at 2450 MHz for 25 mins. in a microwave oven. The slurry was treated in an open tray and evolved vinyl chloride monomer was removed by gentle extraction of air, (about 20 l/min) above the surface of the resin. The final water content was 32% by wt of dry polymer and residual vinyl chloride content of the resin 811 ppm.

EXAMPLE 1

350g from the same batch of suspension PVC homopolymer slurry as was used in Example A, 13 mm deep, covered with a perforated polypropylene sheet 0.01 m thick, with perforations covering 0.1% of the total area of the sheet) in contact with the polymer were irradiated at 2450 MHz for 25 mins. Air was extracted from above the plastic sheet at a low rate (about 20 liters air/hour). The final water content was 40% by wt. of dry polymer and vinyl chloride content 56 ppm.

EXAMPLE B

This is a comparative example not according to the invention.

300 g of a suspension PVC homopolymer resin 13 mm deep (90% of particles 150 $\mu$ or larger) of water content 30% by wt. of dry polymer and vinyl chloride content 7,530 ppm were irradiated in an uncovered tray at 2450 MHz for 25 mins. with gentle extraction of air from the microwave heating oven. The water content fell to 9% by weight and vinyl chloride content to 993 ppm.

EXAMPLE 2

300 g from the same batch of suspension PVC homopolymer as was used in Example B, in a layer 13 mm deep, covered with a perforated polypropylene sheet in contact with the polymer (0.01 mm, and perforations covering 0.1% of the total area of the sheet) were irradiated at 2450 MHz for 25 mins. air was extracted at a gentle rate from above the plastics sheet. The residual water content was 21% by wt. of dry polymer and vinyl chloride content to 17 ppm.

EXAMPLE 3

400 g of a suspension PVC homopolymer similar to that used in Example B 16 mm deep covered with a polyethylene sheet (0.06 mm thick, no perforations) ca. 5 mm from the polymer were irradiated at 2450 MHz for 25 mins. air was extracted at a gentle rate from above the plastics sheet. The final water content was 17% by wt of dry polymer and vinyl chloride content was < 1 ppm.

EXAMPLE C

This is a comparative experiment.

Mass PVC resin particles i.e. made by mass polymerisation of bulk density 620 kg/m³ and containing 3–4% of glassy polymer particles was slurried with water and used for the experiment.

600 g of slurried mass PVC resin 15 mm deep and uncovered of initial water content 34% by wt. of dry polymer and vinyl chloride content 205 ppm were irradiated for 20 mins at 2450 MHz. The water content fell to 21% by wt. of dry polymer and vinyl chloride content to 21 ppm.

EXAMPLE 4

600 g of a slurry of mass PVC similar to that used in Example C covered with a perforated polypropylene sheet (0.01 mm thick with perforations covering 0.04% of the total area) in contact with the polymer were irradiated at 2450 MHz for 20 mins. The water content fell to 26% by wt. of dry polymer and the residual vinyl chloride content was 5 ppm.

The following experiments were carried out on a 4.5 kw continuous conveyor microwave oven (2450 MHz) shown in the figure. However instead of a static plastic sheet vinyl chloride polymer resin was loaded into the oven in perspex (polymethylmethacrylate) trays which were each covered with blown polypropylene film (0.01 mm thick and with perforations covering e.g. 0.1% of the total surface area).

The comparative example D used resin loaded directly onto the belt with no covering of plastics sheet.

EXAMPLE D

This is a comparative example not according to the invention.

Suspension PVC homopolymer slurry, 10 mm deep, was fed into the continuous microwave oven at a rate of 10.5 Kg dry resin/hour, and energy flux of ca. 6 Kw m$^{-2}$. Evolved vinyl chloride monomer and steam were removed by extraction (ca. 700 l/min) above the surface of the resin. The conditions are summarised in Table 1 but the vinyl chloride fell from 9070 ppm to 3720 ppm.

EXAMPLE 5

A similar suspension PVC homopolymer slurry but not from the same batch, 12 mm deep, was loaded into the conveyor microwave oven at a rate of 12.3 kg dry resin/hour, and energy flux of ca. 6 Kw m$^{-2}$. Extraction above the resin was at a rate of ca. 130 l/min. The slurry was covered with a thin, 0.01 mm thick, polypropylene sheet with perforations covering 0.1% of the surface area. The conditions are shown in Table 1 but the vinyl chloride content fell from 9530 ppm to below 3 ppm.

EXAMPLE 6

Mass PVC homopolymer slurry of water content 23% wt (12 mm deep) and containing 0.01% wt MANOXOL O.T. (a surfactant) was fed into the conveyor microwave oven at a rate of 8.2 Kg/dry resin/hour. Energy flux was ca. 5 Kw m$^{-2}$. The residence time was 1110 secs. and extraction above the polymer at a rate of 130 l/min. The slurry was covered with a thin sheet of polypropylene as used in Example 5. The vinyl chloride content fell from 78 ppm to 6 ppm, and the residual water content was 4.5%.

EXAMPLE 7

A vinyl acetate-vinyl chloride PVC copolymer slurry of water content 32% wt, 12 mm deep was fed into the conveyor microwave oven at a rate of 10.2 kg dry resin/hr. Energy flux was ca. 6 Kw m$^{-2}$. The residence time was 1020 secs and extraction rate above the polymer was 130 l/min. The slurry was covered with a thin sheet of polypropylene as used in Example 5. The vinyl chloride content of the slurry fell from 130 ppm to 3 ppm. The final water content was 13%. In addition the vinyl acetate content fell from 1900 ppm to 286 ppm.

The preferred process using a conveyor to convey polymer continuously through a dielectric heating zone, in contrast to the batch examples is preferably operated so that not more than 50% by weight of the water originally present evaporates during the dielectric heating; preferably not more than 30% for example not more than 10% by wt.

As indicated above the preferred thickness of the layer of polymer is 1 to 30 cm. The layer is more preferably at least 4 cm thick. The optimum thickness may vary with the frequency of the radio frequency dielectric heating. Thus for microwave radiation at 2450 MHz, the optimum thickness may be 4 to 12 cm. while at 900 MHz a thickness of 4 to 30 cm may be preferred.

The process of the present invention, as explained above is particularly suitable for the treatment of vinyl halide polymer recovered in particulate form in the process in which it is produced. Vinyl halide polymer "compounds" i.e. mixtures of vinyl halide polymer with stabilizers against thermal degradation and other additives used to make material in a form suitable for fabrication can be produced directly by polymerisation in the presence of the additives and such "compounds" produced directly in the polymerisation reactor in particulate form may be treated by the process of the present invention. It is preferred to treat vinyl halide polymer resin, however.

We claim:

1. The process for reducing the vinyl halide residual monomer content of a polymer containing vinyl halide monomer which comprises heating a water-containing layer of the polymer in particulate form in a zone of

TABLE 1

| Coverage | Example D Uncovered | Example 5 Covered Polypropylene |
|---|---|---|
| Residence Time (secs) | 500 | 1000 |
| Initial H$_2$O Content (% wt on dry resin) | 15 | 22 |
| Final H$_2$O Content (% wt on dry resin) | 3 | 11 |
| Initial VCM Content (ppm) | 9070 | 9530 |
| Final VCM Content (ppm) | 3720 | below 3 | radiofrequency dielectric heating in which zone a layer of material through which vinyl chloride can pass but which restricts the passage of water vapour, and which is substantially transparent to the radiofrequency used to heat the polymer, is disposed over the surface of the layer of the polymer so as to reduce evaporation of water from the layer of polymer during the dielectric heating, and recovering the particulate polymer.

2. The process according to claim 1 wherein any copolymerised monomer constitutes not more than 30% by weight of the polymer.

3. The process according to claim 2 wherein the polymer is vinyl halide polymer resin.

4. The process according to claim 3 wherein the vinyl halide polymer subjected to radiofrequency dielectric heating is in the particulate form in which it is recovered from the polymerisation process in which it was produced.

5. The process according to claim 4 wherein the polymer subjected to radio frequency dielectric heating is in the form of beads recovered from suspension polymerisation.

6. The process according to claim 1 wherein the polymer contains at least 5% by weight of water, based on dry polymer when the dielectric heating begins.

7. The process according to claim 6 wherein the vinyl halide polymer contains at least 10% by weight of water, based on dry polymer, when the dielectric heating begins.

8. The process according to claim 7 wherein the polymer contains up to 30% by weight of water, based on dry polymer, where the dielectric heating begins.

9. The process according to claim 1 wherein the layer of material which restricts the passage of water vapour is a plastic sheet.

10. The process according to claim 9 wherein the plastic sheet is perforated.

11. The process according to claim 10 wherein the combined area of the perforations is not more than 0.1% of the area of the plastic sheet.

12. The process according to claim 9 wherein the water-containing layer of the polymer is conveyed continuously through the dielectric heating zone under conditions such that not more than 10% by weight of the water initially present in the polymer evaporates during the dielectric heating.

13. The process according to claim 1 wherein the dielectric heating is carried out by microwave radiation.

14. The process according to claim 13 wherein the microwave radiation has a frequency in the range 900 to 30,000 MHz.

15. The process according to claim 13 wherein the exposure time of the polymer to dielectric heating is in the range 0:1 seconds to 100 minutes.

16. The process according to claim 15 wherein the exposure time is 1 second to 50 minutes.

17. The process according to claim 13 wherein the polymer is exposed to dielectric heating for a time such that the polymer reaches a temperature in the range 70° C to 100° C.

18. The process according to claim 13 wherein the polymer is exposed to dielectric heating for a time such that the polymer leaving the dielectric heating zone contains at least 5% by weight of water.

* * * * *